United States Patent
Kato (10) Patent No.: US 10,018,954 B1
(45) Date of Patent: Jul. 10, 2018

(54) IMAGE FORMING APPARATUS AND POWER SUPPLY METHOD

(71) Applicants: KABUSHIKI KAISHA TOSHIBA, Tokyo (JP); TOSHIBA TEC KABUSHIKI KAISHA, Tokyo (JP)

(72) Inventor: Tetsuo Kato, Yokohama Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/393,406

(22) Filed: Dec. 29, 2016

(51) Int. Cl.
G03G 15/00 (2006.01)
H04N 1/00 (2006.01)
G06F 3/12 (2006.01)
B41J 23/00 (2006.01)

(52) U.S. Cl.
CPC .......... *G03G 15/80* (2013.01); *B41J 23/00* (2013.01); *G06F 3/1221* (2013.01); *H04N 1/00885* (2013.01)

(58) Field of Classification Search
CPC ........ B41J 23/00; B41J 29/387; B41J 29/393; G06F 3/1221; G06F 3/1229; H04N 1/00885; H04N 1/00901
See application file for complete search history.

(56) References Cited

U.S. PATENT DOCUMENTS

| 9,462,148 | B2 | 10/2016 | Ohhashi | |
|---|---|---|---|---|
| 2002/0163569 | A1* | 11/2002 | Shibuya | B41J 11/0075 347/101 |
| 2009/0317112 | A1* | 12/2009 | Chae | G03G 15/2039 399/67 |
| 2012/0107003 | A1* | 5/2012 | Hasegawa | G03G 15/2046 399/69 |
| 2013/0214603 | A1* | 8/2013 | Tanaka | H02J 9/04 307/66 |

* cited by examiner

*Primary Examiner* — Walter L Lindsay, Jr.
*Assistant Examiner* — Jessica L Eley
(74) *Attorney, Agent, or Firm* — Patterson & Sheridan, LLP (57) ABSTRACT

An image forming apparatus having a plurality of functional units includes a power failure detection circuit configured to detect a power failure of an external power supply for the image forming apparatus, a rechargeable battery unit, and a control unit. The control unit switches the power supply source of the image forming apparatus from the external power supply to the rechargeable battery unit, and selects one or more of the functional units to power through the rechargeable battery unit based on a remaining capacity of the rechargeable battery unit, when the power failure of the external power supply is detected.

12 Claims, 6 Drawing Sheets

IMAGE FORMING APPARATUS AND POWER SUPPLY METHOD

FIELD

Embodiments described herein relate generally to an image forming apparatus and a power supply method.

BACKGROUND

In the related art, an image forming apparatus which is provided with a rechargeable battery and able to operate even when power supply thereto is stopped due to a power failure of the commercial, i.e., local public, power supply, is known.

However, where the image forming apparatus is configured to maintain all of its functionality in a usable state when a power failure or interruption occurs, the usable time of the image forming apparatus once a power failure has occurred is short because the battery can rapidly discharge all of its power to maintain all of the image forming apparatus' functions.

DETAILED DESCRIPTION

In general, according to one embodiment, an image forming apparatus having a plurality of functional units includes a power failure detection circuit configured to detect a power failure of an external power supply for the image forming apparatus, a rechargeable battery unit, and a control unit.

The control unit switches the power supply source of the image forming apparatus from the external power supply to the rechargeable battery unit, and selects one or more of the functional units to power through the rechargeable battery unit based on a remaining capacity of the rechargeable battery unit, when the power failure of the external power supply is detected.

Figure 1:
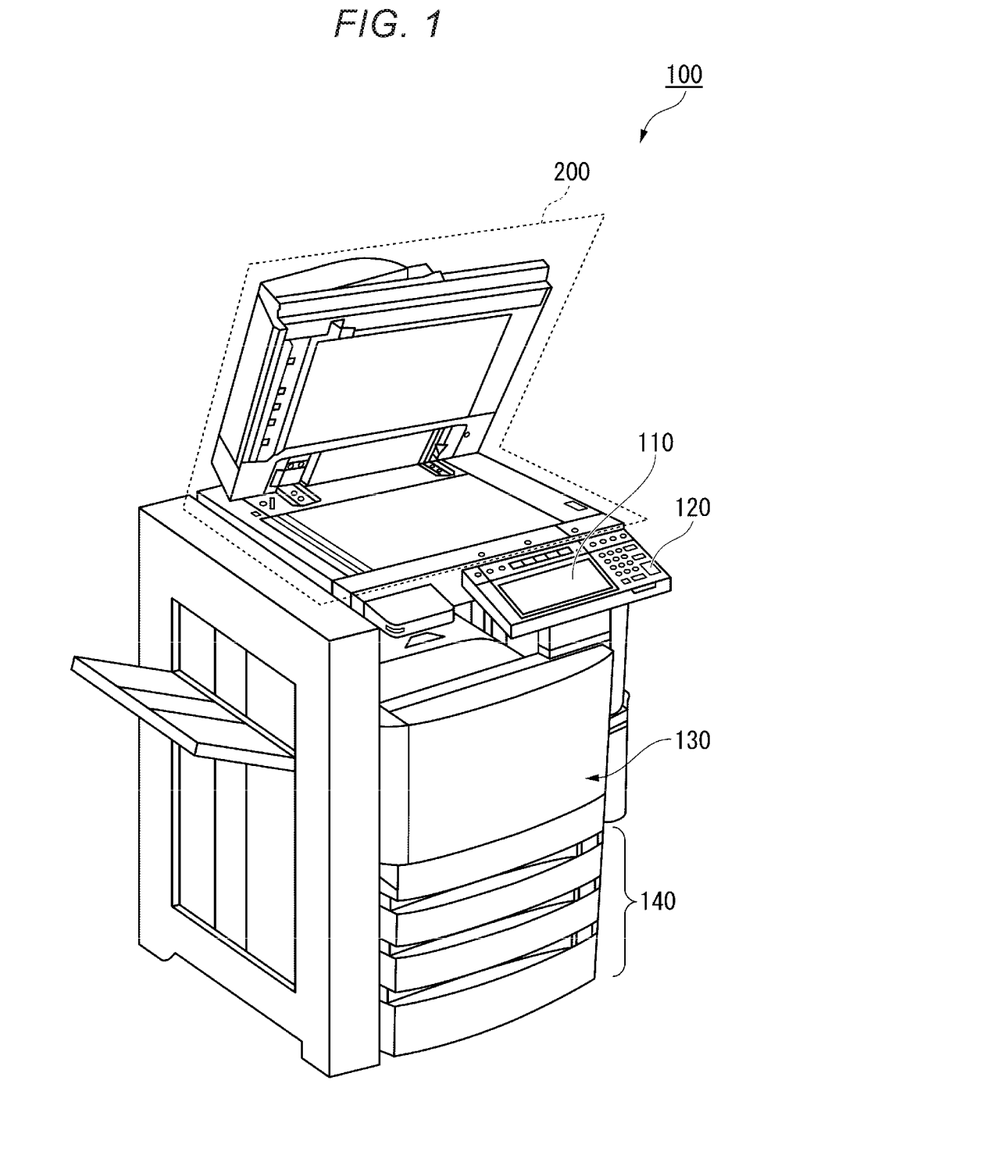
FIG. 1 is a perspective view of an example of an image forming apparatus of an exemplary embodiment.

In the following, an image forming apparatus and a power supply method of an exemplary embodiment is explained with reference to accompanying drawings. FIG. 1 is a diagram illustrating a perspective exterior view of an image forming apparatus 100 of an exemplary embodiment. The image forming apparatus 100 is, for example, a multi-function machine. The image forming apparatus 100 includes a display 110, a control panel 120, a printer unit 130, a sheet accommodation unit 140, and an image reading unit 200. The printer unit 130 of the image forming apparatus 100 may be an apparatus fixing a toner image, or an inkjet type apparatus.

The image forming apparatus 100 forms an image on a sheet using a recording agent such as toner. The sheet is, for example, paper or label paper. The sheet may be any type of sheet as long as the image forming apparatus 100 can form an image on the surface of the sheet.

The display 110 is an image display device such as a liquid crystal display, an organic electro luminescence (EL) display, or the like. The display 110 displays various information concerning the status and operation of the image forming apparatus 100.

The control panel 120 includes a plurality of user selectable buttons. The control panel 120 receives a user's input requesting performance of one or more operations. The control panel 120 outputs a signal according to operations selected by the user to the control unit of the image forming apparatus 100. The display 110 and the control panel 120 may be integrally configured as a touch panel.

The printer unit 130 forms an image on a sheet based on image information generated by the image reading unit 200 or image information received through a communication path to the image forming apparatus 100. The printer unit 130 forms an image by, for example, using the following methodology: An image forming unit of the printer unit 130 forms an electrostatic latent image on a photoconductive drum based on image information. The image forming unit of the printer unit 130 causes a recording agent, for example toner, to attach to the electrostatic latent image to form a visible image thereby. A specific example of the recording agent includes toner. A transfer unit of the printer unit 130 transfers the visible image onto the sheet. A fixing unit of the printer unit 130 performs heating and pressing with respect to the sheet to fix the visible image on the sheet.

The sheet which is subjected to the image forming process by the printer unit 130 may be a sheet accommodated in the sheet accommodation unit 140 or a sheet manually supplied by the user. The sheet accommodation unit 140 accommodates the sheet used for forming an image by the printer unit 130.

The image reading unit 200 reads information of an image being read based on the brightness and darkness of the image. The image reading unit 200 records the read image information. The recorded image information may be transmitted to another information processing apparatus through a network. The image of the recorded image information is formed on a sheet by the printer unit 130.

A first battery 16 (rechargeable battery), a second battery 17, and a third battery 18 are provided in the image forming apparatus 100. The capacity (total possible charge or power) of the first battery 16 is the largest among three batteries. The capacity of the third battery 18 is the smallest among the three batteries. That is, the relationship of the battery capacity as between three batteries is that the capacity of the first battery is larger than the capacity of the second battery which is larger than the capacity of the third battery. A power supply control unit 1, which controls power supply from the three batteries when a power failure of the commercial power supply occurs, is provided inside the image forming apparatus 100. When a power failure occurs, operations of the image forming apparatus 100 are maintained by the batteries 16, 17 and 18 as controlled by the power supply control unit 1.

Figure 2:
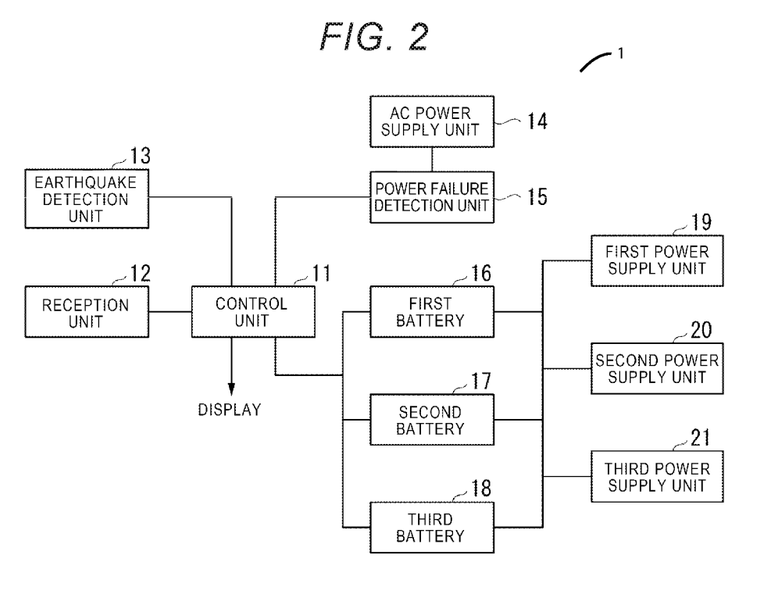
FIG. 2 is a diagram illustrating a configuration of a power supply control unit provided in the image forming apparatus.

Next, a configuration of the power supply control unit 1 provided inside the image forming apparatus 100 will be described with reference to FIG. 2. FIG. 2 is a diagram illustrating a configuration of the power supply control unit 1 provided inside the image forming apparatus 100. When the externally supplied power to the image forming apparatus 10 fails or is interrupted or a natural disaster occurs, the power supply control unit 1 controls supply of power by the rechargeable batteries 16, 17 and 18 provided inside the image forming apparatus 100 to one or more functional units of the image forming apparatus 100.

The power supply control unit 1 includes a control unit 11, which is a hardware controller implemented as an application specific integrated circuit (ASIC), field programmable gate array (FPGA), or a processor programmed with a control program, a reception unit 12, an earthquake (or other natural disaster notification) detection unit 13 (hereinafter an earthquake detection unit), an AC power supply unit 14, and a power failure detection unit 15. In one embodiment, the reception unit 12 is implemented as a circuit, the earthquake detection unit is implemented as a circuit, the AC power supply unit is implemented as a circuit, and the power failure detection unit is implemented as a circuit.

The power supply control unit 1 includes a first battery 16, a second battery 17, and a third battery 18. The power supply control unit 1 includes a first power supply unit 19, a second power supply unit 20, and a third power supply unit 21.

The control unit 11 integrally controls operations of the power supply control unit 1. The reception unit 12 receives an emergency earthquake (or other disaster) warning issued by a meteorological or other agency. The reception unit 12 may be equipped with an emergency earthquake (or other natural disaster event) warning receiving method capable of receiving a signal from a mobile phone base station, acquiring information through the Internet, or receiving a radio wave. The earthquake detection unit 13 includes an acceleration sensor, determines that an earthquake has occurred and outputs an earthquake detection result, when detected acceleration output by the acceleration sensor exceeds a predetermined value. The AC power supply unit 14 is connected to the commercial power supply and supplies power used for the operations performed by the image forming apparatus 100. The power failure detection unit 15 detects occurrence of the power failure based on whether or not the supply of AC power has stopped.

The first battery 16 is configured as a rechargeable battery and supplies power to perform the functions of the image forming apparatus 100 as a result of a power supply instruction from the control unit 11. The second battery 17 is configured as a rechargeable battery and supplies power to perform the functions of the image forming apparatus 100 as a result of a power supply instruction from the control unit 11. The third battery 18 is configured as a rechargeable battery and supplies power to perform the functions of the image forming apparatus 100 as a result of a power supply instruction from the control unit 11. When a power failure does not occur and the ac power supply 14 is supplying power from an external source to the image forming apparatus 100, the first battery 16, the second battery 17, and the third battery 18 are charged by power supplied from the AC power supply unit 14. The functions the functions of the image forming apparatus 100 which are maintained by the battery power are implemented by functional units provided in the image forming apparatus 100. Specific examples of the functional units include an image forming unit, a reception unit, an image reading unit, and a FAX communication unit. The image forming unit is hardware installed with a function of forming an image on a sheet. The reception unit is hardware installed with a function of receiving information from an external device through a wired communication path or a wireless communication path. The image reading unit is hardware installed with a function of reading the image formed on the sheet. The FAX communication unit is hardware installed with a function of receiving a FAX signal from another apparatus. The functional units provided in the image forming apparatus 100 are not limited to the specific examples described above. Details of the functions maintained by the power of the respective batteries will be described later herein.

The image forming apparatus 100 includes three types of batteries including a large-capacity battery (first battery 16), a medium-capacity battery (second battery 17), and a small-capacity battery (third battery 18) in conformity with the layout and available volume therefor inside the image forming apparatus 100. The reason that three batteries are provided is to maintain the function of the image forming apparatus 100 in a usable state using power of the other batteries when any one or two of the batteries fail or are depleted.

The first power supply unit 19 supplies power to respective functional units so that all functions equipped in the image forming apparatus 100 are in a usable state. The first power supply unit 19 supplies power using power stored in the first battery 16, the second battery 17, and the third battery 18. The first power supply unit 19 supplies power to respective functional units so that all functions are in a usable state and thus, uses the first battery of which the capacity is the largest.

Figure 3:
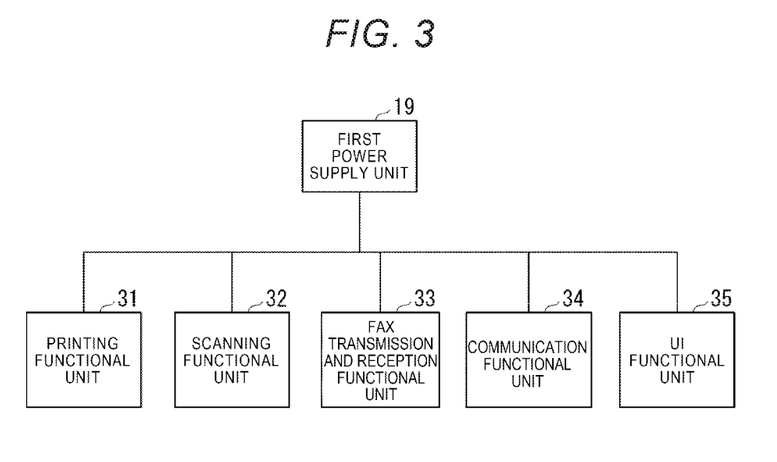
FIG. 3 is a diagram illustrating functional units to which power is supplied by a first power supply unit.

FIG. 3 is a diagram illustrating functional units to which power is supplied by a first power supply unit 19. The first power supply unit 19 supplies power to a printing functional unit 31, a scanning functional unit 32, a FAX transmission and reception functional unit 33, a communication functional unit 34, and a user interface (UI) functional unit 35. The printing functional unit 31 is a functional unit implementing a function for the printer unit 130 illustrated in FIG. 1. The scanning functional unit 32 is a functional unit implementing a function for the image reading unit 200 illustrated in FIG. 1.

The second power supply unit 20 supplies power to selected functional units so that functions except for a printing function, as among the functions equipped in the image forming apparatus 100, are in a usable state. The second power supply unit 20 supplies power using power stored in the second battery 17. The second power supply unit 20 supplies power to respective functional units so that all functions of the image forming apparatus except for the printing function are in a usable state and thus, uses a second battery of which the capacity is approximately a medium level. The functions except for the printing function include a user interface operation function, a scanning function, a FAX transmission and reception function, and a communication function (transmitting and receiving of mail or the like) are maintained by the second battery. The user interface operation function enables input operations and displaying using a display 110 and a control panel 120 illustrated in FIG. 1. During operation of the second power supply unit 20, received FAXes and e-mails or other electronic documents received by the image forming apparatus cannot be printed but the contents or descriptors of the received FAXes, emails and other documents can be displayed on the display 110 such that the contents can be confirmed by the user.

Figure 4:
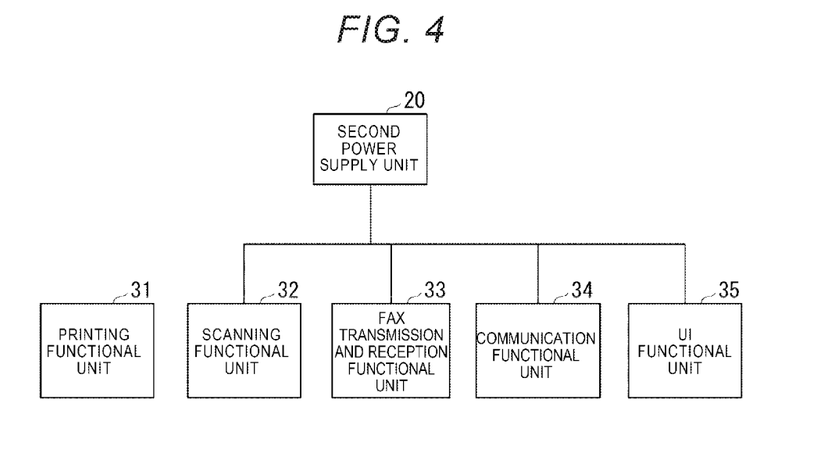
FIG. 4 is a diagram illustrating functional units to which power is supplied by a second power supply unit.

FIG. 4 is a diagram illustrating functional units to which power is supplied by the second power supply unit 20. The second power supply unit 20 supplies power from the second battery 17 and the third battery 18 to the scanning functional unit 32, the FAX transmission and reception functional unit 33, the communication functional unit 34, and the UI functional unit 35.

The third power supply unit 21 supplies power to respective functional units so that only the user interface operation and the communication function, as among the functions equipped in the image forming apparatus 100, are in a usable state. The third power supply unit 21 supplies power using the power stored in the third battery 18. The third power supply unit 21 supplies power to selected functional units so that only the user interface operation and the communication function are in a usable state and thus, uses the third battery of which the capacity is the smallest as among the three batteries 16, 17 and 18. During operation of the third power supply unit 21, received FAXes and e-mails or other electronic documents received by the image forming apparatus cannot be printed but the contents or descriptors of the received FAXes, emails and other documents can be displayed on the display 110 such that the contents can be confirmed by the user.

Figure 5:
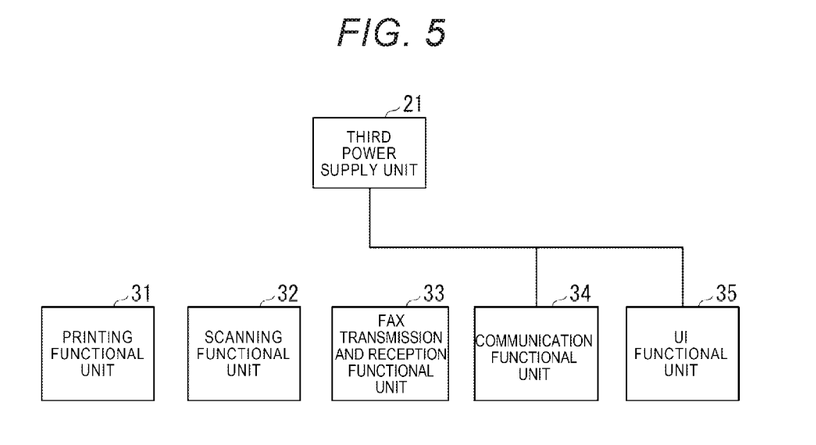
FIG. 5 is a diagram illustrating functional units to which power is supplied by a third power supply unit.

FIG. 5 is a diagram illustrating functional units to which power is supplied by the third power supply unit 21. The third power supply unit 21 supplies power only to the communication functional unit 34 and the UI functional unit 35.

Figure 6:
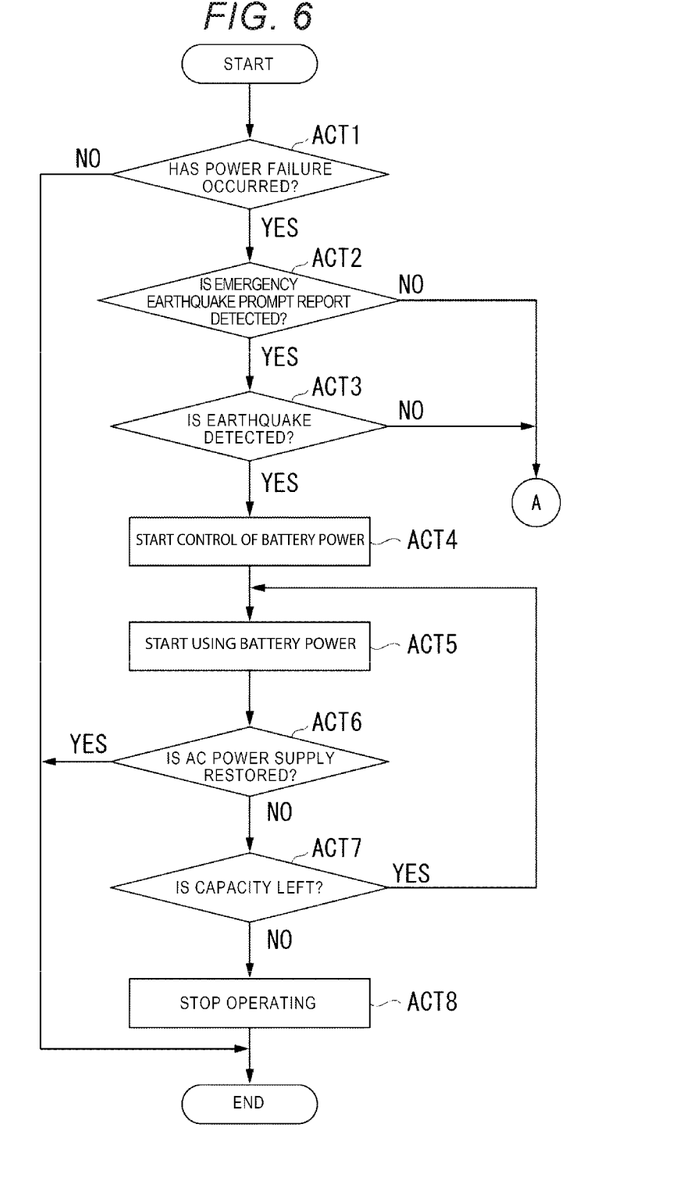
FIG. 6 is a flowchart illustrating operations of the power supply control unit.
Figure 7:
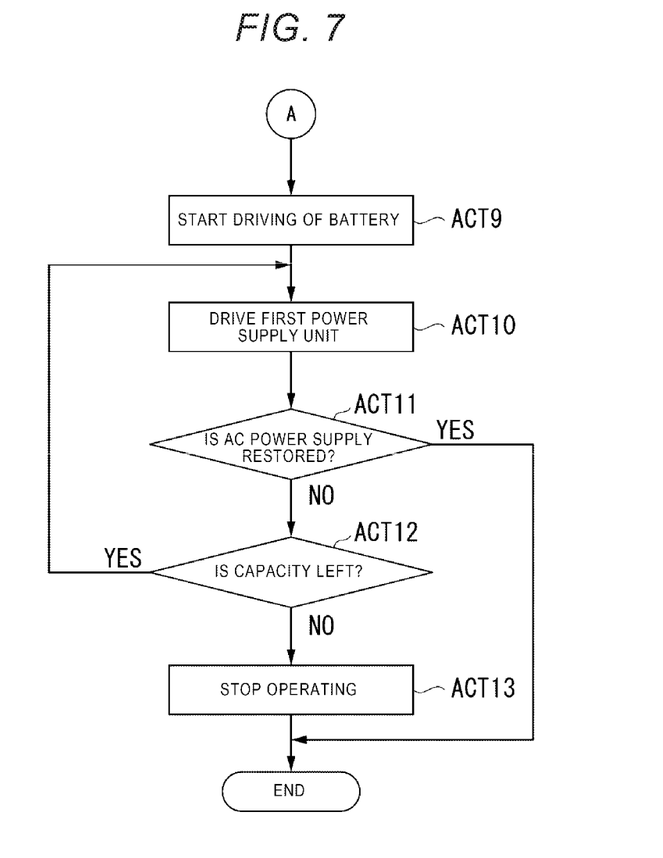
FIG. 7 is a flowchart illustrating other operations of the power supply control unit.

Next, operations of the power supply control unit 1 illustrated in FIG. 2 will be described with reference to FIGS. 6 and 7. FIGS. 6 and 7 are flowcharts illustrating operations of the power supply control unit 1 illustrated in FIG. 2. The operations illustrated in FIGS. 6 and 7 are repeatedly executed at predetermined time intervals. Power is always supplied to the power supply control unit 1 from any of the first battery, the second battery, and the third battery such that the power supply control unit 1 is able to operate even when a power failure occurs, so long as usable power remains in any of the three batteries 16, 17 and 18.

First, the control unit 11 reads an output of the power failure detection unit 15 and determines whether a commercial power failure has occurred (ACT1). As a result of this determination, when the power failure has not occurred (ACT1: NO), the control unit 11 ends processing. On the other hand, when a power failure occurs (ACT1: YES), the control unit 11 reads an output of the reception unit 12 and determines whether an emergency earthquake warning (or other warning) is detected (ACT2).

As a result of the determination, when the emergency earthquake warning is detected (ACT2: YES), the control unit 11 reads an output of the earthquake detection unit 13 and determines whether an earthquake is detected (ACT3). As a result of the determination, when the earthquake is detected (ACT3: YES), the control unit 11 starts battery-powered operation (ACT4). When the battery-powered operation is started, the control unit 11 supplies power based on the capacities of the batteries 16, 17 and 18 (ACT5). The control unit 11 reads the output of the power failure detection unit 15 and determines whether the commercial AC power supply is restored (ACT6). As a result of this determination, that the commercial AC power supply is restored (ACT6: YES), the control unit 11 switches the power supply source to the AC power supply unit 14 and ends processing. In this case, the control unit 11 stops disabling image forming apparatus functions such that all functions become usable. On the other hand, when the commercial AC power supply is not restored (ACT6: NO), the control unit 11 reads the remaining capacity of the third battery 18 and determines whether battery power remains (ACT7). The determination as to whether battery power remains to power the image forming apparatus is based on whether the voltage of the third battery 18 is less than or equal to a predetermined value. As battery power is consumed by the image forming apparatus 100 in the order of the first battery 16, the second battery 17, and the third battery 18, if the third battery 18 does not have remaining capacity (remaining power), none of the batteries have remaining capacity (remaining power).

As a result of this determination, when there is remaining battery capacity (ACT7: YES), the control unit 11 returns to ACT5 and repeats the processing. On the other hand, when there is no remaining battery capacity (ACT7: NO), the control unit 11 outputs a message to the display 110. The message sent to the display 110 is, for example "Functions will stop soon." The control unit 11 stops operating the image forming apparatus 100 (ACT8) and the image forming apparatus 100 shuts down.

Next, operations when a power failure without the occurrence of a disaster such as an earthquake (FIG. 7) will be described. When the emergency earthquake warning is not detected (ACT2: NO in FIG. 6) and thus when an earthquake is not detected (ACT3: NO in FIG. 6), the control unit 11 starts the battery-powered operation of the image forming apparatus 100 (ACT9).

The control unit 11 issues an instruction to the first power supply unit 19 (ACT10). The first power supply unit 19 receiving the instruction supplies power to all of the functional units of the image forming apparatus 100 using the power stored in the first battery 16, the second battery 17, and the third battery 18. As such, even when the power failure occurs, all functions of the image forming apparatus 100 may be maintained in a usable state.

The control unit 11 reads an output of the power failure detection unit 15 and determines whether the commercial AC power supply has been restored (ACT11). As a result of the determination, when the commercial AC power supply has been restored (ACT11: YES), the control unit 11 switches the power supply source to the commercial AC power supply unit 14 and ends processing. On the other hand, when the commercial AC power supply has not been restored (ACT11: NO), the control unit 11 reads the remaining capacity of the first battery 16, the second battery 17, and the third battery 18 and determines whether battery capacity remains to power the image forming apparatus 100 (ACT12). The determination that insufficient battery capacity remains is based on whether voltages of the first battery 16, the second battery 17, and the third battery 18 are less than or equal to a predetermined value, i.e., they have been discharged below a threshold level.

As a result of the determination, when sufficient battery capacity remains in any one of the three batteries to power the image forming apparatus 100 (ACT12: YES), the control unit 11 returns to ACT10 and continues the processing. On the other hand, when insufficient battery capacity remains (ACT12: NO), the control unit 11 outputs a message to the display 110. The message to be output is, for example, "Functions will stop soon." The control unit 11 then stops operating the image forming apparatus 100 (ACT13), and the image forming apparatus 10 shuts down.

Figure 8:
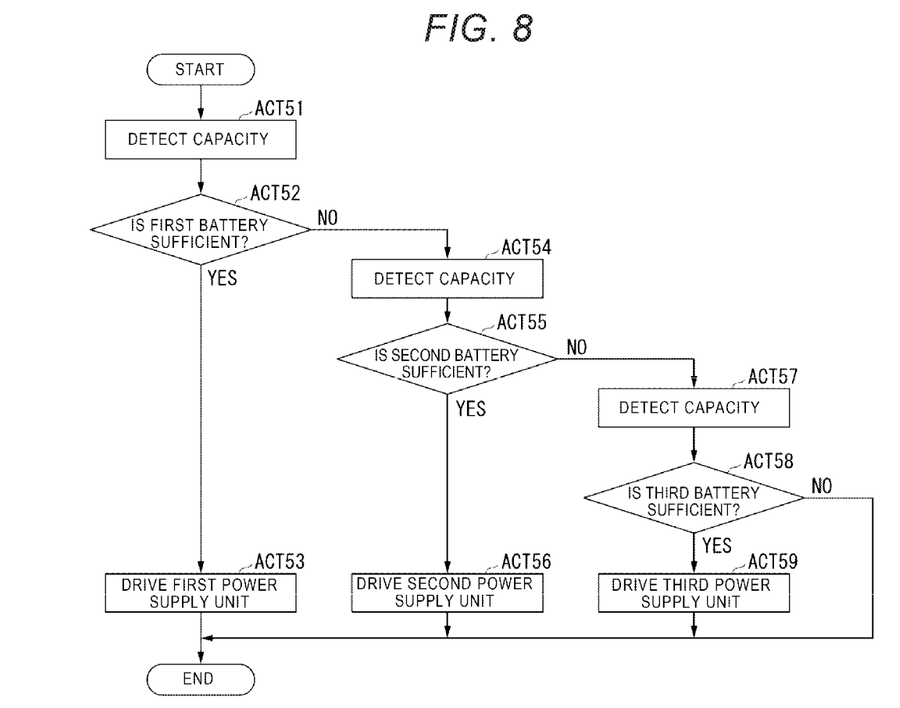
FIG. 8 is a flowchart illustrating details of control operations of power supply according to a battery capacity.

Next, details of control operations of power supply (ACT5) based on the remaining battery capacity as illustrated in FIG. 6 will be described with reference to FIG. 8. FIG. 8 is a flowchart illustrating details of control operations (ACT5) of power supplied to the image forming apparatus 100 based on the remaining battery capacity as illustrated in FIG. 6.

First, when control of power supplied using battery capacity is started, the control unit 11 detects the remaining capacity of the first battery 16 (ACT51). The detected remaining battery capacity is based on the detected voltage value of the first battery 16.

Next, the control unit 11 determines whether the remaining capacity of a first battery is sufficient to power the desired functions of the image forming apparatus 100 (ACT52). As a result of this determination, when the remaining capacity of the first battery is sufficient (ACT52: YES), the control unit 11 issues an instruction to the first power supply unit 19 (ACT53).

The first power supply unit 19 receiving this instruction supplies power to all of the functional units of the image forming apparatus 100 using the power stored in the first battery 16. In this case, the control unit 11 outputs a message to the display 110. The message to be output is, for example, "Being operated using battery." Thus, even when a power failure occurs, all functions of the image forming apparatus 100 may be maintained in a usable state.

When the remaining capacity of the first battery is not sufficient, i.e., the first battery 16 is discharged below the threshold value and cannot power all of the functionality of the image forming apparatus 100 (ACT52: NO), the control unit 11 detects the remaining capacity of the second battery 17 (ACT54). Subsequently, the control unit 11 determines whether the remaining capacity of the second battery is sufficient to power a preselected reduced number of desired functions of the image forming apparatus 100 (ACT55). As a result of the determination, when the remaining capacity of the second battery is sufficient (ACT55: YES), the control unit 11 issues an instruction to the second power supply unit 20 (ACT56).

The second power supply unit 20 receiving the instruction supplies power to the functional units of the image forming apparatus 100, except the printing unit, using the power stored in the second battery 17. In this case, the control unit 11 outputs a message to the display 110. The message to be output is, for example, "Being operated using battery. Only scanner and communication functions such as, FAX transmission, displaying of receipt of email and electronic documents, and the like are usable. Printing is not allowed." Thus, even when a power failure occurs, functions except for the printing function of the image forming apparatus 100 may be maintained in a usable state.

When the remaining capacity of the second battery is not sufficient to power the image forming apparatus 100 with the reduced functionality (ACT55: NO), the control unit 11 detects the remaining capacity of the third battery 18 (ACT57). Subsequently, the control unit 11 determines whether the remaining capacity of the third battery is sufficient to power the image forming apparatus 100 with even further reduced functionality (ACT58). As a result of the determination, when the remaining capacity of the third battery is sufficient to power the image forming apparatus 100 with even further reduced functionality (ACT58: YES), the control unit 11 issues an instruction to the third power supply unit 21 (ACT59).

The third power supply unit 21 receiving the instruction supplies power to preselected functional units of the image forming apparatus 100 using power stored in the third battery such that only the user interface operation and the communication function of the image forming apparatus 100 are in a usable state. In this case, the control unit 11 outputs a message to the display 110. The message to be output is, for example, "Being operated using battery. Only communication functions such as email are usable." With this, even when a power failure occurs, the user interface operation and the communication function are in a usable state. On the other hand, when the remaining capacity of the third battery is not sufficient to power the image forming apparatus 100 with even further reduced functionality, a message stating that the image forming apparatus will shut down soon is displayed. Then, the control unit 11 ends the processing and the image forming apparatus shuts down.

Although an example of a configuration of an image forming apparatus in which three batteries are provided is described in the above-description, a configuration in which only a single battery is provided may be adopted. Also, in this case, the functions of the image forming apparatus 100 receiving power from battery power are selected based on the remaining battery capacity, and thus some usable functions are disabled.

Although an example of a configuration in which three batteries of which capacities are different from each other are provided is described, if space inside the image forming apparatus 100 is available, the size, and thus the capacity, of three batteries may be the same.

As having been described above, operable functions are restricted according to a remaining capacity of the battery and thus, operable time of the image forming apparatus 100 during a power failure may be extended. In particular, functions may be restricted based on the assumption that the duration of the power failure accompanied by a disaster is long, resulting in an extended usable time of the image forming apparatus under battery powered operation. When a power failure occurs which is not accompanied by a disaster, all functions are initially maintained in a usable state using the power stored in all of the batteries without restricting functions and thus, usability of the image forming apparatus under battery power may be improved.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. An image forming apparatus having a plurality of functional units, comprising:
  a power failure detection circuit configured to detect a power failure of an external power supply for the image forming apparatus;
  a plurality of rechargeable batteries, each one of the plurality of rechargeable batteries having a different capacity from the other; and
  a control unit configured to switch the power supply source of the image forming apparatus from the external power supply to the plurality of rechargeable batteries, detect a remaining capacity of each of the plurality of rechargeable batteries, and select one or more of the functional units to power through the plurality of rechargeable batteries based on a remaining capacity of the plurality of rechargeable batteries, when the power failure of the external power supply is detected, and after the power failure of the external power supply is detected, when a capacity of one of the rechargeable batteries with a largest capacity is discharged below a threshold value, stop supplying power to an image forming functional unit.

2. The apparatus according to claim 1, wherein
when a functional unit is disabled, the control unit outputs information indicating which functions are not disabled.

3. The apparatus according to claim 1, wherein
after the power failure of the external power supply is detected, when only one of the rechargeable batteries with a smallest capacity has remaining power, the control unit stops supplying power to all functional units except a communication functional unit.

4. The apparatus according to claim 1, wherein
when restoration of the external power supply is detected by the power failure detection circuit, the control unit switches the power supply source of the image forming apparatus to the external power supply and supplies power to all of the functional units.

5. The apparatus according to claim 1, wherein
the control unit is configured to detect a remaining power of the plurality of rechargeable batteries based on a voltage value of the plurality of rechargeable batteries.

6. The apparatus according to claim 5, wherein
when the remaining power of the plurality of rechargeable batteries is inadequate to power the image forming apparatus, the control unit issues a message that all functional units will be powered down and then stops operating.

7. A power supply method performed by an image forming apparatus including a plurality of rechargeable batteries, each one of the plurality of the rechargeable batteries having a different capacity from the other, the method comprising:
detecting a power failure of an external power supply;
detecting a remaining capacity of the plurality of rechargeable batteries;
switching the power supply source of the image forming apparatus from the external power supply to the plurality of rechargeable batteries, and selecting one or more functionalities of the image forming apparatus to disable based on a remaining capacity of the plurality of rechargeable batteries, when the power failure of the external power supply is detected, and
after the power failure of the external power supply is detected, and when a capacity of one of the rechargeable batteries with a largest capacity is discharged below a threshold value, one of the functionalities that is disabled is image forming.

8. The method according to claim 7, wherein
after the power failure of the external power supply is detected, when only one of the rechargeable batteries with the smallest capacity has remaining power, all of the functionalities are disabled except for communication.

9. The method according to claim 7, further comprising:
after the power failure of the external power supply is detected, displaying a message indicating which of the functionalities are maintained.

10. The method according to claim 7, further comprising:
upon detecting restoration of the external power supply, switching the power supply source of the image forming apparatus from the plurality of rechargeable batteries to the external power supply and enabling all of the functionalities.

11. The method according to claim 7, further comprising:
detecting the remaining capacity of the plurality of rechargeable batteries based on a voltage value of the plurality of rechargeable batteries.

12. The method according to claim 11, further comprising:
upon detecting that a remaining power of the plurality of rechargeable batteries is inadequate to power the image forming apparatus, issuing a message that all functional units will be powered down.

* * * * *